United States Patent
Saracco et al.

(10) Patent No.: US 10,110,866 B1
(45) Date of Patent: Oct. 23, 2018

(54) SCANNING LASER PROJECTORS WITH IMPROVED SHORT PROJECTION DISTANCE IMAGE QUALITY

(71) Applicant: Microvision, Inc., Redmond, WA (US)

(72) Inventors: Matthieu Saracco, Redmond, WA (US); Roeland Collet, Olympia, WA (US); Alga Lloyd Nothern, III, Seattle, WA (US); Nenad Nestorovic, Seattle, WA (US); Jack H. Schmidt, San Marcos, CA (US)

(73) Assignee: Microvision, Inc., Redmond, WA (US)

( * ) Notice: Subject to any disclaimer, the term of this patent is extended or adjusted under 35 U.S.C. 154(b) by 0 days.

(21) Appl. No.: 15/631,097

(22) Filed: Jun. 23, 2017

(51) Int. Cl.
*H04N 9/31* (2006.01)
*G02B 27/00* (2006.01)

(52) U.S. Cl.
CPC ....... *H04N 9/3185* (2013.01); *G02B 27/0025* (2013.01); *H04N 9/3135* (2013.01); *H04N 9/3161* (2013.01); *H04N 9/3188* (2013.01)

(58) Field of Classification Search
CPC .......................... H04N 9/3185; G02B 27/0025
USPC ............ 348/746, 744, 747, 806; 353/33, 34
See application file for complete search history.

(56) References Cited

U.S. PATENT DOCUMENTS

| | | | |
|---|---|---|---|
| 7,854,523 B2 | 12/2010 | Nestorovic et al. | |
| 2006/0139718 A1* | 6/2006 | Ishihara | G02B 26/101 359/205.1 |
| 2009/0251668 A1* | 10/2009 | Takahashi | G03B 21/28 353/33 |
| 2017/0153455 A1* | 6/2017 | Takahashi | G02B 27/0172 |

OTHER PUBLICATIONS

Microvision, Inc., , "Short-Throw Interactive Display PicoP Scanning Engine Product Brief", Published Consumer Electronics Show Jan. 6, 2017, Jan. 6, 2017.

* cited by examiner

*Primary Examiner* — Michael Lee
*Assistant Examiner* — Jean W Desir
(74) *Attorney, Agent, or Firm* — Kevin D. Wills (57) ABSTRACT

The embodiments described herein provide scanning laser devices that include an output optic configured to reduce image distortion. Specifically, the output optic is configured to reduce the distortions that could otherwise occur at relatively short projection distances, while also providing good image quality at relatively long projection distances. In general, the output optic includes a prism having a first surface, a second surface, and a third surface. The prism is configured such that the laser light interacts with each of these three surfaces while being transmitted through the prism and outputted to the display surface. The first, second, and third surfaces are each formed to have a freeform rotationally asymmetric shape, and these freeform rotationally asymmetric shapes are configured to work together to correct distortion in projected images.

21 Claims, 9 Drawing Sheets

SCANNING LASER PROJECTORS WITH IMPROVED SHORT PROJECTION DISTANCE IMAGE QUALITY

FIELD

The present disclosure generally relates to scanning laser devices, and more particularly relates to scanning laser projectors.

BACKGROUND

In scanning laser devices, laser light is reflected off one or more scanning mirrors to generate a scanning pattern. For example, in scanning laser projectors, images are projected onto surfaces by scanning laser light into a pattern with a scanning mirror, with individual pixels generated by modulating the laser light during the scan. Some scanning laser projectors use multiple scanning mirrors to scan the laser light into a pattern. For example, some scanning laser projectors use a first scanning mirror to provide for scanning in one axis of motion, while using a second scanning mirror to provides for scanning in another axis of motion.

One issue with scanning laser projectors is achieving good image quality at different projection distances. For example, it is desirable to for a scanning laser projector to have good image quality at both a relatively far projection distance and at a relatively close projection. Providing good image quality over a relatively wide range of projection distances facilitates the use of the scanning laser projector in different configurations and in different applications.

Unfortunately, some past scanning laser projectors have been limited in their ability to provide acceptable image quality over such a range of distances. For example, some scanning laser projectors have been unable to provide good image quality at the relatively short projection distances needed for some applications. These scanning laser projectors can have relatively high levels of distortion when used at relatively short projection distances, and thus can be unable to provide acceptable image quality in some configurations. Thus, there is a continuing need for devices and techniques that provide improved image quality in scanning laser projectors, and in particular, reduce distortions in projected images when projected onto surfaces at relatively short distances.

DESCRIPTION OF EMBODIMENTS

The embodiments described herein provide scanning laser projectors that include an output optic configured to reduce image distortion. Specifically, the output optic is configured to reduce the distortions that could otherwise occur at relatively short projection distances, while also providing good image quality at relatively long projection distances.

In general, the output optic includes a prism having a first surface, a second surface, and a third surface. The prism is configured such that the laser light interacts with each of these three surfaces while being transmitted through the prism and outputted to the display surface. The first, second, and third surfaces are each formed to have a freeform rotationally asymmetric shape, and these freeform rotationally asymmetric shapes are configured to work together to correct distortion in projected images.

Specifically, the scanning laser projector is configured to pass the laser beam through the prism such that laser light interacts with each of the three prism surfaces before exiting the prism and being outputted to project an image on the display surface. At each interaction, the freeform rotationally asymmetric shape of the surface reflects or refracts the laser beam, with the combined result of these reflections/refractions being a reduction in the distortion of the projected images. Specifically, the interactions combine to reduce the distortion of the projected image at relatively short projection distances, while image quality is substantially maintained at longer distances.

The use of such an output optic can improve the performance of a variety of scanning laser projectors. For example, the output optic can be used to facilitate a "table mode" where the scanning laser projector projects on relatively close horizontal table surface, while still providing a "wall mode" where the scanning laser projector projects on a relatively far vertical wall surface. Furthermore, in addition to standard projectors, the embodiments described herein can be applied to other types of scanning laser projectors, such as heads up displays (HUDs) and head mounted displays (HMDs).

Figure 1:
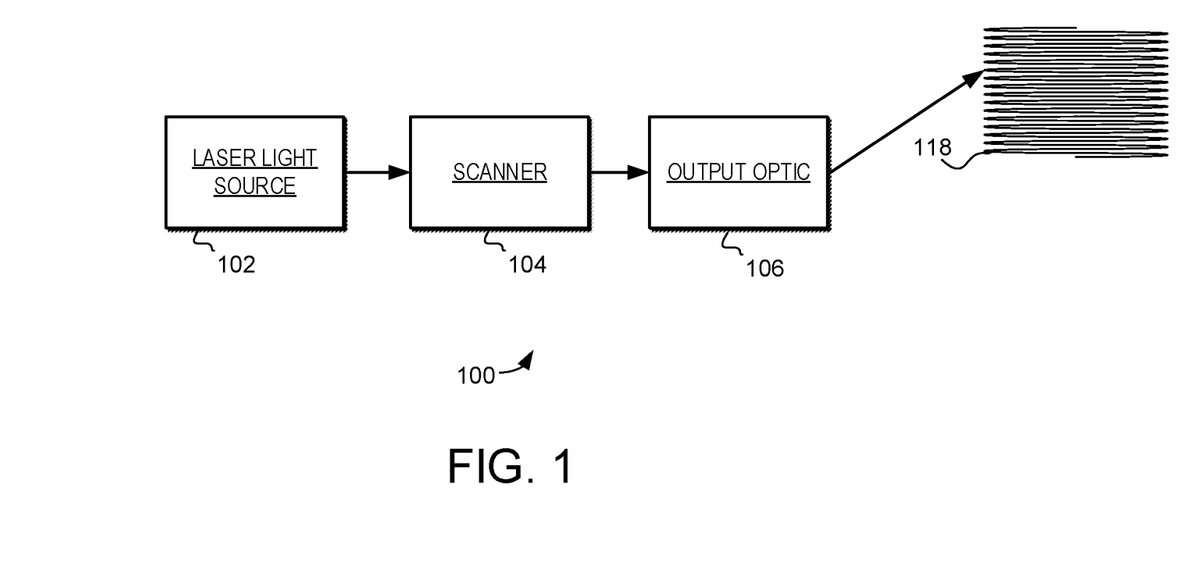
FIG. 1 shows a schematic diagram of scanning laser projector in accordance with various embodiments of the present invention.

Turning now to FIG. 1, an exemplary scanning laser projector 100 is illustrated schematically. The scanning laser projector 100 includes a laser light source 102, a scanner 104, and an output optic 106. It should be noted that the example in FIG. 1 is a simplified example of a typical device, and that scanning laser projectors would thus typically include additional elements and features. More detailed examples of such a scanning laser projector will be discussed below.

The laser light source 102 can be implemented with any suitable laser(s) and to generate any suitable type of a laser light for use in the scanning laser projector 100. For example, the laser light source 102 can include lasers of various colors (e.g., red, green, and blue) suitable for image projection. As other examples, laser light source 102 can include non-visible lasers, such as infrared. In a typical implementation the laser light source 102 would be driven based on the specific requirements of the scanning laser projector 100. For example, the laser light source 102 would typically be driven to generate a laser beam encoded with pixel data to generate image pixels. Detailed examples of such devices will be discussed in greater detail with reference to FIG. 7 below.

The laser light source 102 thus provides a beam of laser light that is projected by the scanning laser projector 100. To facilitate this, the scanner 104 includes one or more scanning surface(s) (e.g., one or more mirrors) that controllably reflect the laser beam. Specifically, during operation of the scanning laser projector 100, the motion of the scanning surface (s) in the scanner 104 is controlled to reflect the beam of laser light into a desired scan pattern 118. In a typical implementation, the scanner 104 provides for two axes of motion, (e.g., horizontal and vertical).

In accordance with the embodiments described herein, the output optic 106 is implemented to receive the laser beam from the scanner 104. The laser beam passes through the output optic 106 and is outputted to a display surface to generate a projected image. It should be noted that in some embodiments additional optical elements can be provided between the scanner 104 and the display surface. For example, additional optical elements can be provided after the output optic 106. In general, the output optic 106 is configured to reduce the distortions that could otherwise occur at relatively short projection distances, while also providing good image quality at relatively long projection distances. For example, the output optic 106 can be configured to reduce both keystone and smile distortions at relatively short projection distances. In general, keystone distortion is caused by an image being projected onto a surface that is angled with respect to the projector, and if uncorrected can result in the projected image having a trapezoidal shape. Likewise, smile distortion is generally caused by having different path lengths from the scanner 104 to the display surface for different scan angles, and can be exacerbated by a non-orthogonal angle of incidence on the surface(s) of the scanner 104. The output optic 106 can be configured to reduce these distortions while maintaining a desired ratio of laser spot size to ideal pixel size.

To facilitate this reduction in distortion at short projection distances, the output optic 106 includes a prism. In some embodiments, the output optic 106 may also include additional optical elements such as additional refractive elements or mirrors. In general, the prism is a transparent optical element that includes at least a first surface, a second surface, and a third surface. The prism is configured such that the laser beam interacts with each of these three surfaces while being transmitted through the prism. In different embodiments, these interactions with the surfaces can comprise various combinations of reflections and refractions. The prism is configured such that each of these interactions with the surfaces affects the resulting image. Specifically, the surfaces of the prism are each formed to have a freeform rotationally asymmetric shape, and these freeform rotationally asymmetric shapes are configured to reflect or refract the laser light in a way that functions together to correct distortion in projected images.

In general, the prism is configured such that the laser beam enters the prism through the first surface and reflects internally at the second surface. Again, in such an embodiment, these shapes of these surfaces and the resulting interactions at the first surface and second surface both serve to reduce distortion in the final projected image.

As a more specific example, in one embodiment the prism is configured such that the laser beam enters the prism through the first surface, reflects internally at the second surface, and exits the prism through the third surface. In such an embodiment, these interactions at the first surface, second surface, and third surface all serve to reduce distortion in the final projected image. An example of such an embodiment will be discussed with reference to FIG. 3.

As another more specific example, in one embodiment the prism is configured such that the laser beam enters the prism through the first surface, reflects internally at the second surface, reflects internally at the third surface, and exits the prism through the first surface. In such an embodiment, these interactions at the first surface, second surface, and third surface all serve to reduce distortion in the final projected image. It should be noted that in this embodiment the laser beam interacts with the first surface twice, i.e., both when entering and exiting the prism. In this case the shape of the first surface can be configured to work the laser during both interactions. An example of such an embodiment will be discussed with reference to FIG. 4.

As another more specific example, in one embodiment the prism is configured such that the laser beam enters the prism through the first surface, reflects internally at the second surface, reflects internally at the third surface, and exits the prism through the second surface. In such an embodiment, these interactions at the first surface, second surface, and third surface all serve to reduce distortion in the final projected image. It should be noted that in this embodiment the laser beam interacts with the second surface twice, i.e., both when reflecting internally at the second surface and when exiting the prism at the second surface. Examples of such an embodiment will be discussed with reference to FIGS. 5A and 5B.

In some embodiments the output optic 106 may also include additional optical element(s). These additional optical element(s) can include mirrors and/or additional refractive elements. For example, in some of these embodiments the output optic 106 can include another prism, lens, or freeform surface mirror.

For example, the output optic 106 can also include a mirror, with the output optic 106 configured such that the laser beam reflects off the mirror. In such an embodiment the mirror may also have a freeform rotationally asymmetric shape that is configured to work with the freeform rotationally asymmetric shapes of the first surface, second surface and third surface.

In yet other examples, the output optic 106 can also include a refractive optical element, with the output optic 106 configured such that the laser beam refracts off one or more surfaces in the refractive optical element. Again, in such an embodiment the refractive optical element can have at last one surface with a freeform rotationally asymmetric shape that is configured to work with other freeform rotationally asymmetric shapes. Examples of such and embodiment will be discussed with reference to FIGS. 6A and 6B.

As was noted above, the output optic 106 is configured to reduce the distortions that could otherwise occur at relatively short projection distances, while also providing good image quality at relatively long projection distances. Additionally, the output optic 106 can be configured to reduce these distortions while maintaining a desired ratio of laser spot size to ideal pixel size. Finally, it is desirable that the output optic 106 provide these results while limiting introduced chromatic aberrations. Providing good image quality over a relatively wide range of projection distances facilitates the use of the scanning laser projector 100 in different configurations and in different applications.

Finally, the output optic 106 can be configured to perform other adjustments and compensations in the scanning laser projector 100. For example, the output optic 106 can be configured to increase the output angle of projection, commonly referred to as the field of view. For example, in some embodiments the output optic 106 can be configured to generate a field of view of up to 56 degrees, considerably above the 45 degrees that is commonly produced by a scanning laser projector. Such an increased field of view can dramatically increase the size of the projected image for a given projection distance. This, this can again facilitate the use of relatively short projection distances.

As other examples, the output optic 106 can be configured to compensate for a non-orthogonal projection angle with respect to the display surface. Finally, the output optic 106 can be configured to compensate for a non-normal MEMS feed angle, where the MEMS feed angle is the angle at which the laser beam impacts the scanning surface of the mirror.

Figure 2A:
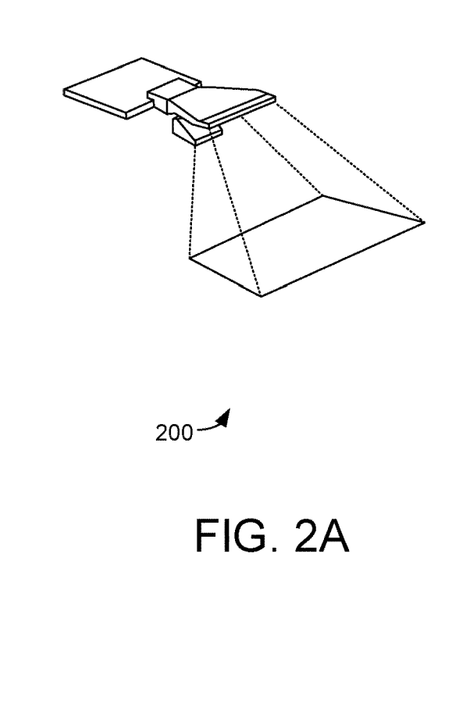
FIGS. 2A and 2B shows perspective views of a scanning laser projector in two different use configurations in accordance with various embodiments of the present invention.
Figure 2B:
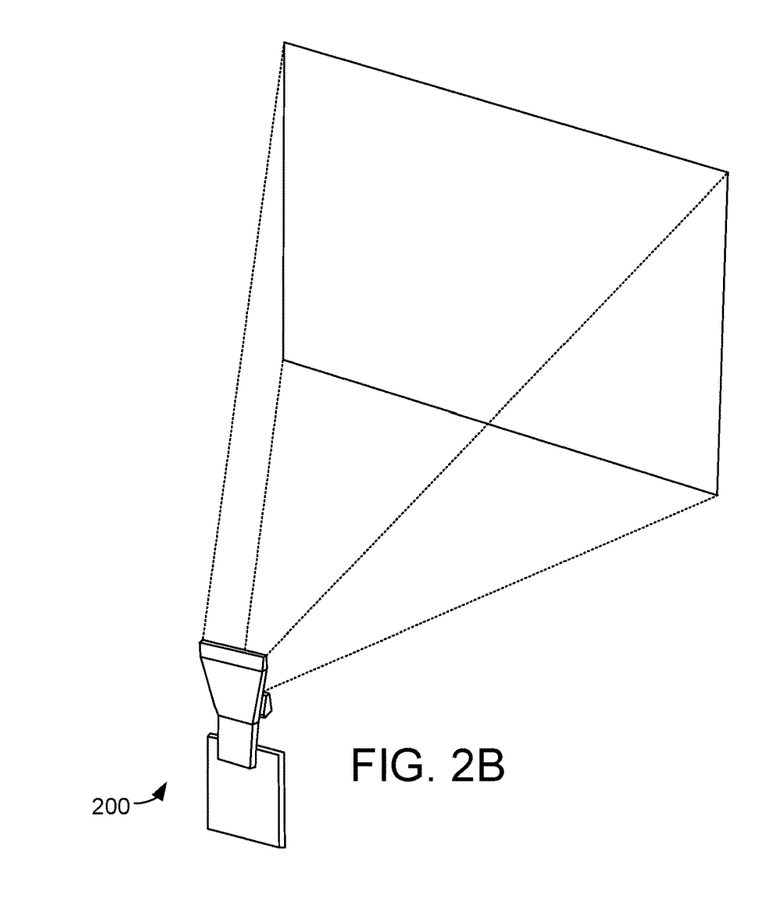

Turning now to FIGS. 2A and 2B, an exemplary scanning laser projector 200 is illustrated schematically in two different use configurations. Specifically, in FIG. 2A the scanning laser projector 200 is illustrated in a relatively short throw use application, and in FIG. 2B the scanning laser projector 200 is illustrated in in a relatively long use application. Specifically, in FIG. 2A the scanning laser projector 200 is in being used in a "table mode" where it projects onto a table or other surface that is a relatively short distance away. In contrast, in FIG. 2B the scanning laser projector 200 is being used in a "wall mode" where it projects onto a wall or other surface that is a relatively long distance away. To facilitate a scanning laser projector 200 that provides good image quality when used in both "wall mode" and "table mode" the embodiments described herein use an output optic that reduces the distortions that could otherwise occur at relatively short projection distances, while still providing good image quality at relatively long projection distances. As one specific example, the output optic can be designed and configured to provide good image quality at relatively short projection distances of 100 mm to 400 mm while also providing good image quality at relatively long projection distances of 2000 mm to 3000 mm.

It should be noted that in a typical embodiment, the output optic can provide this good image quality at short and long distances without requiring a physical change in the configuration of the scanning laser projector 200. For example, good image quality can be provided at relatively short and long distances without requiring the temporary insertion or removal of other optical elements in the optical path to facilitate a switch between short and long throw projection modes.

And again, the output optic can be configured to increase the field of view of the scanning laser projector 200. As described above, in some configurations the output optic 106 can be configured to generate horizontal and/or vertical fields of view of up to 56 degrees. Such an increased field of view can dramatically increase the size of the projected image, which is particularly import for short projection distances such as that shown in FIG. 2A.

Figure 3:
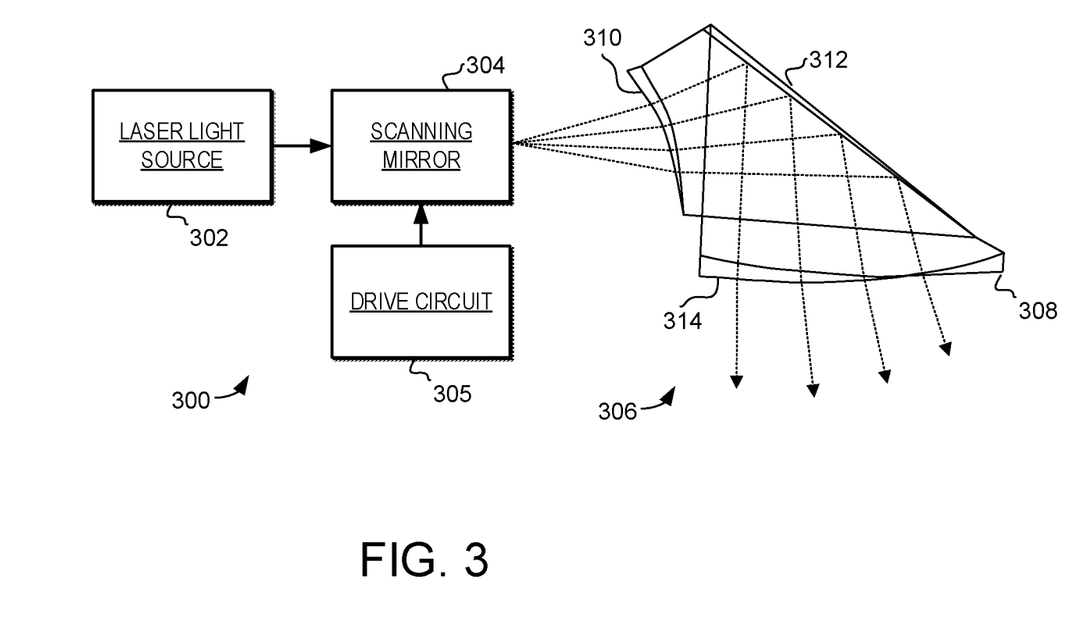
FIG. 3 shows a schematic diagram of a scanning laser projector in accordance with an embodiments of the present invention.

Turning now to FIG. 3, a schematic diagram of an exemplary scanning laser projector 300 is illustrated. The scanning laser projector 300 includes a laser light source 302, scanning mirror(s) 304, drive circuit(s) 305, and an output optic 306. During operation, the laser light source 302 generates at least one beam of laser light that is reflected by the scanning mirror 304 into a pattern of scan lines. As one example, the pattern of scan lines can comprise a raster pattern. However, this is just one example, and in other embodiments, other patterns of scan lines can be generated as used. For example, spiral patterns and Lissajous patterns could instead be implemented.

To facilitate this, the drive circuit 305 controls the movements of their corresponding scanning mirror 304. Specifically, the drive circuit 305 provides excitation signals to excite motion of the scanning mirror 304. To facilitate image projection, the beam of laser light would be encoded with pixel data to generate image pixels.

In accordance with the embodiments described herein, the output optic 306 is configured to reduce the distortions that could otherwise occur at relatively short projection distances, including both keystone and smile distortions, while also providing good image quality at relatively long projection distances. Additionally, the output optic 306 can be configured to reduce these distortions while maintaining a desired ratio of laser spot size to ideal pixel size.

In the embodiment of FIG. 3, the output optic 306 comprises a prism 308. The prism 308 includes a first surface 310, a second surface 312, and a third surface 314. The prism 308 is configured such that the laser beam interacts with each of the first surface 310, second surface 312, and third surface 314 before being outputted from the prism 308. The prism 308 is further configured such that each of these interactions with the surfaces 310, 312 and 314 modifies the path of the laser beam by reflection/or refractions, and thus each of these interactions affects the resulting image. Specifically, the surfaces 310, 312 and 314 of the prism 308 are each formed to have a freeform rotationally asymmetric shape, and these freeform rotationally asymmetric shapes are configured to generate reflections/refractions that function together to correct distortion in projected images.

In the embodiment of FIG. 3, the prism 308 is configured such that the laser beam enters the prism 308 through the first surface 310, reflects internally at the second surface 312, and exits the prism 308 through the third surface 314. Again, in such an embodiment, these interactions at the first surface 310, second surface 312, and third surface 314 all work together to reduce distortion in the final projected image.

It should be noted that the interactions between the laser beam and first surface 310 and third surface 314 are refractions that occur as the light passes through the surface, while the interaction between the laser beam and the second surface 312 are reflections that occur at as the light strikes the second surface 312.

A variety of structures and configurations can be used to facilitate reflection at the second surface 312. For example, in some embodiments, the prism 308 can be configured to use total internal reflection (TIR) to facilitate the reflection at the second surface 312. In general, TIR occurs when light strikes a medium boundary at an angle that is larger than the critical angle with respect to the surface, where the critical angle is determined by the refractive indices of the materials at the boundary. Thus, the prism 308 can use TIR by configuring the angles and materials to result in the laser light striking the second surface 312 at an angle larger than the critical angle.

In other embodiments, the prism 308 can be configured to use reflective coatings to facilitate reflection at the second surface 312. In such embodiments any suitable reflective coating can be used. For example, dielectric and/or metallic coatings can be applied to the second surface 312 to facilitate reflection. It should be noted that in such an embodiment dielectric coatings typically can be used in combination with TIR, while metallic coatings interfere with TIR and cannot be used.

Anti-reflective coatings can similarly be provided to the first surface 310 and the third surface 312 to inhibit reflection and promote transmission through the surfaces. Again, any suitable anti-reflective coating can be used to facilitate transmission, including dielectric coatings.

The prism 308 can be formed using any suitable optically transparent material and with any suitable manufacturing technique. For example, the prism 308 can comprise optically suitable plastic or glass materials. As examples of manufacturing techniques, the prism 308 can be formed by injection molding or 3D printing. In some embodiments, the freeform rotationally asymmetric shapes at the surfaces 310, 312 and 314 can be created during the formation of the prism 308. In other embodiments these surfaces can be individually tuned or modified by diamond tuning or other machining techniques.

Figure 4:
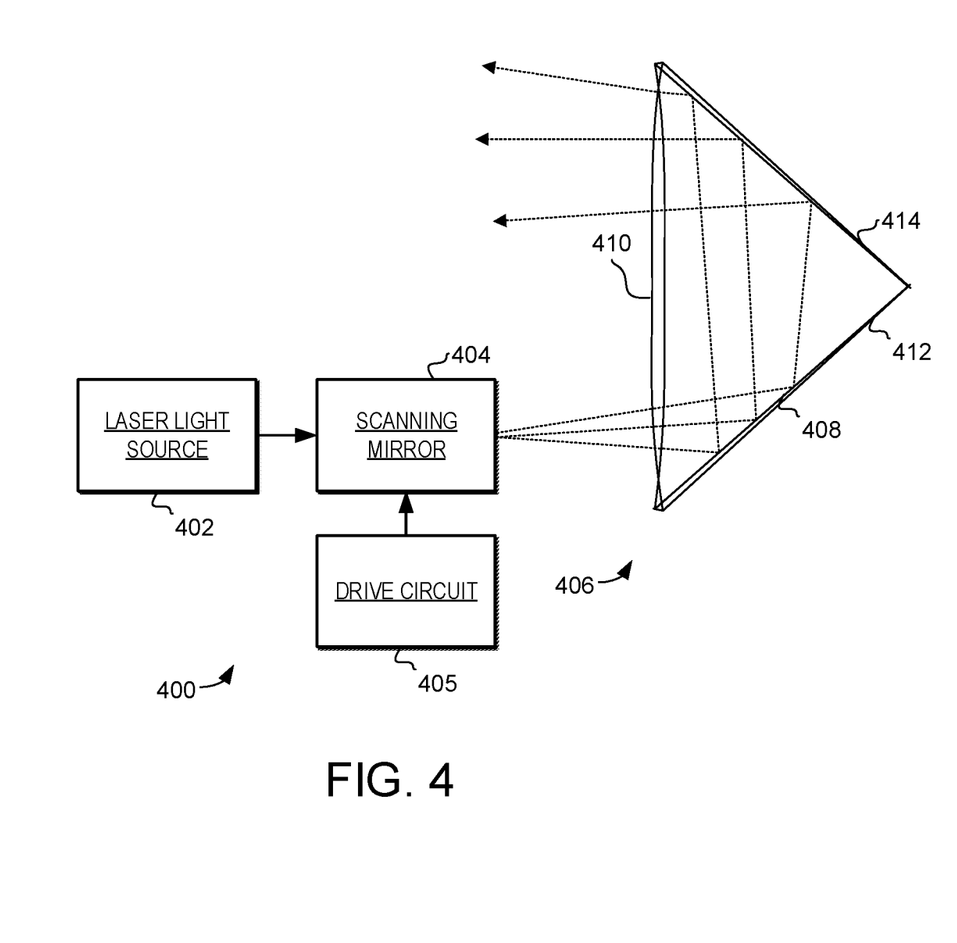
FIG. 4 shows a schematic diagram of a scanning laser projector in accordance with another embodiments of the present invention.

Turning now to FIG. 4, a schematic diagram of another exemplary scanning laser projector 400 is illustrated. The scanning laser projector 400 includes a laser light source 402, scanning mirror(s) 404, drive circuit(s) 405, and an output optic 406. During operation, the laser light source 402 generates at least one beam of laser light that is reflected by the scanning mirror 404 into a pattern of scan lines. Again, the drive circuit 405 provides excitation signals to excite motion of the scanning mirror 404.

In accordance with the embodiments described herein, the output optic 406 is again configured to reduce the distortions in projected images. In the embodiment of FIG. 4, the output optic 406 comprises a prism 408 that includes a first surface 410, a second surface 412, and a third surface 414. The prism 408 is configured such that the laser beam interacts with each of the first surface 410, second surface 412, and third surface 414 before being outputted from the prism 408.

Again, the prism 408 is configured such that each of these interactions with the surfaces 410, 412 and 414 modifies the path of the laser beam and thus affects the resulting image. Specifically, the surfaces 410, 412 and 414 of the prism 408 are each formed to have a freeform rotationally asymmetric shape, and these freeform rotationally asymmetric shapes are configured to function together to correct distortion in projected images.

In the embodiment of FIG. 4, the prism 408 is configured such that the laser beam enters the prism 408 through the first surface 410, reflects internally at the second surface 412, reflects internally the third surface 414, and exits the prism 408 through the first surface 410. Again, in such an embodiment, these interactions at the first surface 410, second surface 412, and third surface 414 all work together to reduce distortion in the final projected image.

It should be noted that the interactions between the laser beam and first surface 410 are refractions that occur as the light passes through the surface, while the interactions between the laser beam and the second surface 412 and third surface 414 are reflections that occur at as the light strikes the surfaces. And in contrast with the embodiment of FIG. 3, in this embodiment the laser beam interacts with the first surface 410 twice. Specifically, the laser beam interacts with the first surface 410 once when entering the prism 408, and again when exiting the prism 408. Because the laser beam interacts with the first surface 410 twice, the first surface 410 has a greater ability to affect the resulting projected image.

It should also be noted that the configuration of the prism 408 is such that the cone of laser light entering the prism 408 through the surface first 410 does not substantially overlap with the cone of laser light exiting the prism 408 through the first surface 410. Thus, these two different regions of first surface 410 can each be independently optimized and shaped without regard for the other interaction that occurs at the surface 410. This can increase the flexibility of the design and provide increased distortion reduction.

Like the embodiment of FIG. 3, a variety of structures and configurations can be used to facilitate reflection at the second surface 412 and the third surface 414. For example, in some embodiments, the prism 408 can be configured to use total internal reflection (TIR) and/or reflective coatings to cause these reflections. And again, anti-reflective coatings can similarly be provided to the first surface 410 to inhibit reflection and promote transmission. And again, the prism 408 can be formed using any suitable optically transparent material and with any suitable manufacturing technique.

Figure 5A:
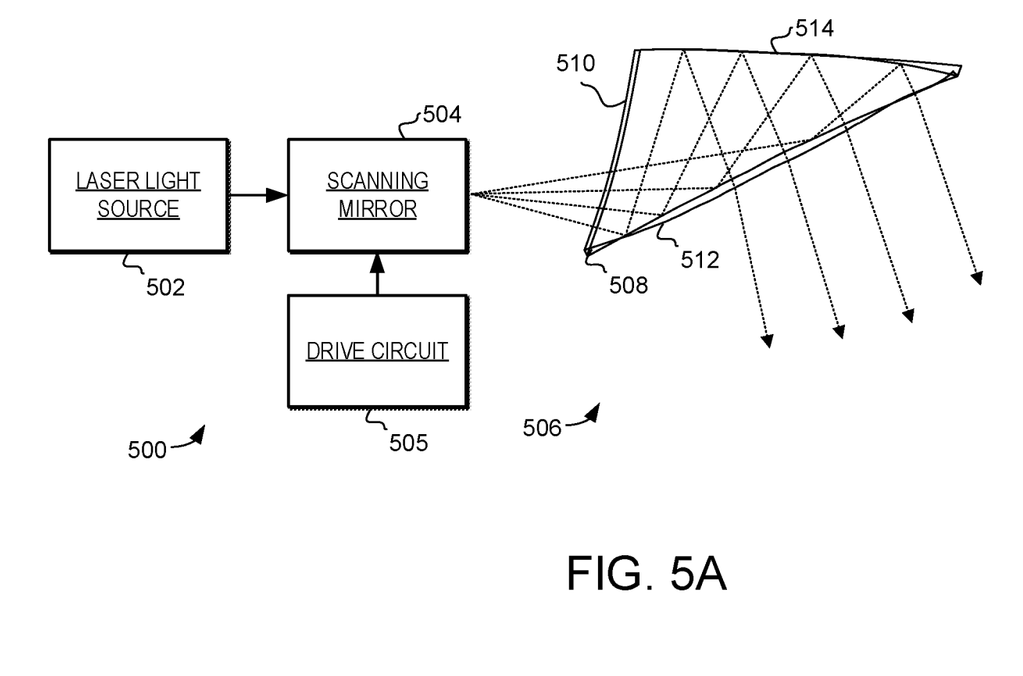
FIGS. 5A and 5B show schematic views of a scanning laser projector in accordance with various embodiments of the present invention.

Turning now to FIG. 5A, a schematic diagram of another exemplary scanning laser projector 500 is illustrated. The scanning laser projector 500 again includes a laser light source 502, scanning mirror(s) 504, drive circuit(s) 505, and an output optic 506. During operation, the laser light source 502 generates at least one beam of laser light that is reflected by the scanning mirror 504 into a pattern of scan lines. Again, the drive circuit 505 provides excitation signals to excite motion of the scanning mirror 504 in a way that will generate the pattern of scan lines.

In accordance with the embodiments described herein, the output optic 506 is configured to reduce the distortions in projected images. In the embodiment of FIG. 5A, the output optic 506 comprises a prism 508 that includes a first surface 510, a second surface 512, and a third surface 514. The prism 508 is configured such that the laser beam interacts with each of the first surface 510, second surface 512, and third surface 514 before being outputted from the prism 508.

Again, the prism 508 is configured such that each of these interactions with the surfaces 510, 512 and 514 modifies the path of the laser beam and thus affects the resulting image. Specifically, the surfaces 510, 512 and 514 of the prism 508 are each formed to have a freeform rotationally asymmetric shape, and these freeform rotationally asymmetric shapes are configured to function together to correct distortion in projected images.

In the embodiment of FIG. 5A, the prism 508 is configured such that the laser beam enters the prism 508 through the first surface 510, reflects internally at the second surface 512, reflects internally the third surface 514, and exits the prism 508 through the second surface 512. Again, in such an embodiment, these interactions at the first surface 510, second surface 512, and third surface 514 all work together to reduce distortion in the final projected image. It again should be noted that the interactions between the laser beam and the surfaces comprise both reflections and refractions.

Like the embodiment of FIG. 4, in prism 508 some of the interactions occur twice. Specifically, the laser beam interacts with the second surface 512 once when it reflects off the second surface 512, and again when exiting the prism 508 though the second surface 512. Because the laser beam interacts with the second surface 512 twice, the second surface 512 has a greater ability to affect the resulting projected image.

It should also be noted that the configuration of the prism 508 is such that the cone of laser light in the first interaction overlaps with the cone of laser light in the second interaction. Specifically, the cone of laser light reflecting off the second surface 512 overlaps with the cone of laser light refracting through the second surface 512 when exiting the prism 508. This overlap means that the shape of the second surface 512 in this region should be optimized for both interactions. This can reduce the flexibility of the design and limit the effectiveness of the distortion reduction. However, this overlap can also reduce the size of the prism 508 and thus result in a more compact device.

Figure 5B:
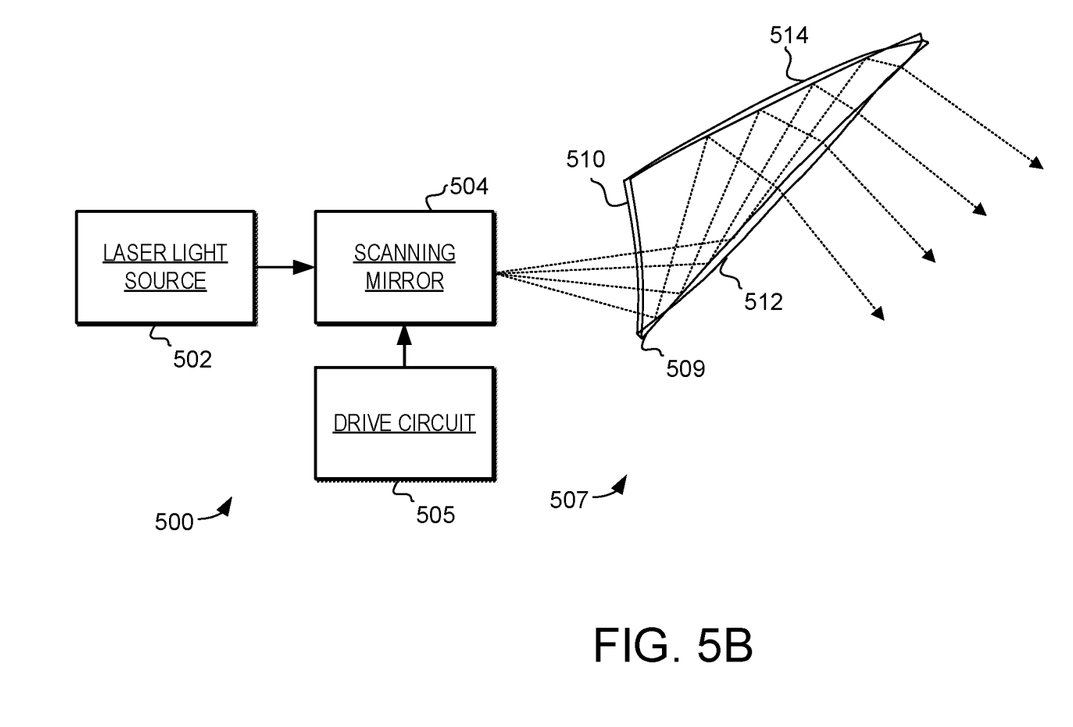

Turning now to FIG. 5B, the output optic 507 and prism 509 is illustrated with a modified configuration that results in non-overlapping laser light at the second surface 512.

Specifically, in the example of FIG. 5B the prism 509 is such that the cone of laser light reflecting off the second surface 512 does not overlaps with the cone of laser light exiting the prism 509 through the second surface 512. Again, such a lack overlap means that the different regions of the second surface 512 can have independently optimized shapes. This can again increase the flexibility of the design and provide increased distortion reduction.

Referring now to both FIG. 5A and FIG. 5B, a variety of structures and configurations can be used to facilitate reflections and refractions at the various surfaces. For example, in some embodiments, the prism 508 can be configured to use various combinations of total internal reflection (TIR), reflective coatings, and anti-reflective coatings.

With regard to second surface 512, because this surface interacts with the laser beam using both reflection and refraction, care must be taken such that any coatings or structures used on second surface 512 do not interfere with either interaction. Furthermore, the specifics of such a configuration would typically be different for implementations where the cone of laser lights for both reflection and refraction overlap at the second surface (e.g., as shown in FIG. 5B) compared to implementations where the cones of laser light do not overlap.

For example, in the embodiment of FIG. 5A where the cones of laser light of the two interactions overlap at the second surface 512, it can be desirable to facilitate TIR at the second surface 512 and use an antireflective coating on the second surface 512 that will not interfere with TIR. For example, when TIR is used for reflection at the second surface 512, a dielectric anti-reflective coating can also be used to facilitate the transmission out of the second surface 512, as such a coating will typically not reduce the effectiveness of TIR. However, typical metallic reflective coatings generally cannot be used, as metallic reflective coatings will commonly interfere with TIR.

Alternatively, in the embodiment of FIG. 5B where the cones of laser light of the two interactions do not overlap at the second surface 512, an anti-reflective can be applied to region of the second surface 512 where the laser light refracts through the surface. In such an embodiment the anti-reflective coating would not be applied to the other region of second surface 512 where reflection occurs. That other region could instead include a reflective coating, or could instead use TIR to facilitate reflection.

Figure 6A:
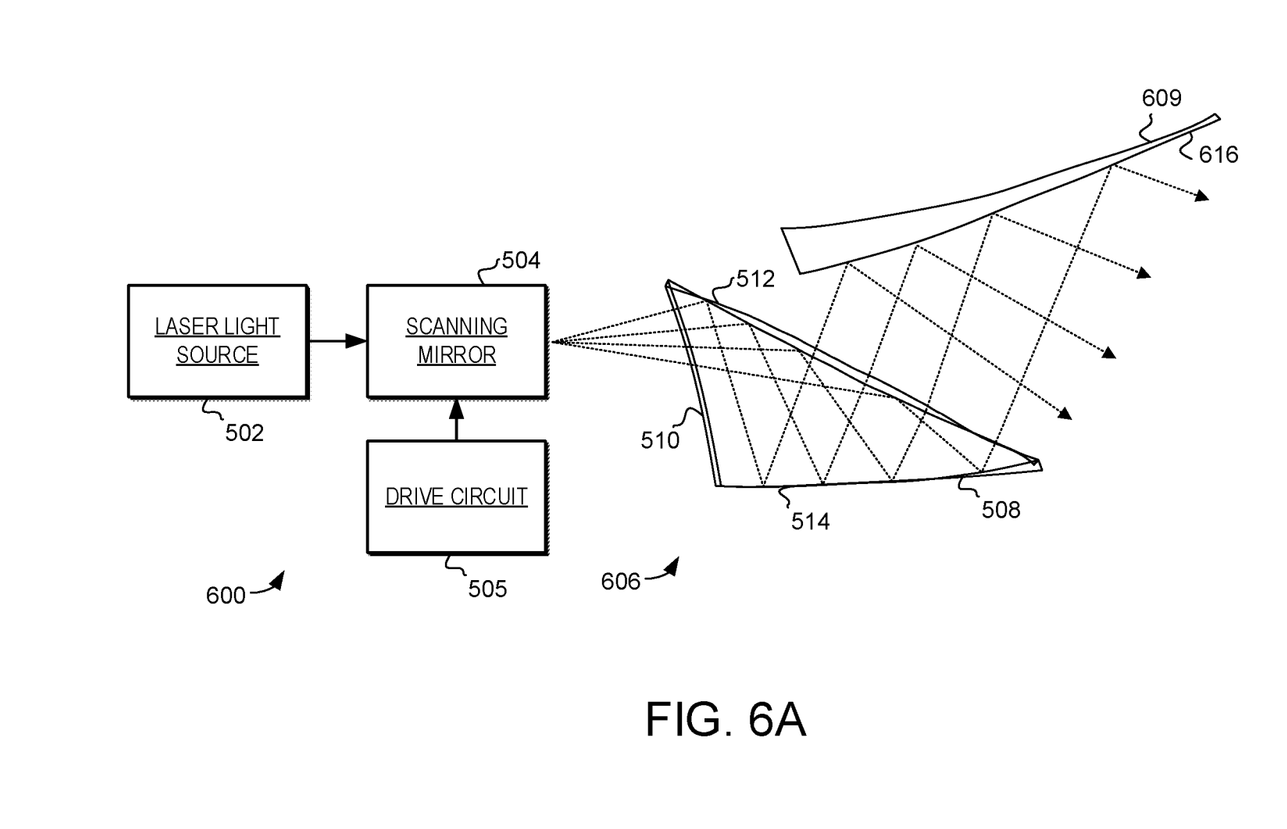
FIGS. 6A and 6B show schematic views of a scanning laser projector in accordance with various embodiments of the present invention.

Turning now to FIG. 6A, a schematic diagram of another exemplary scanning laser projector 600 is illustrated. The scanning laser projector 600 is similar to the projector 500 illustrated in FIG. 5, with the difference being the addition of another optical element in the output optic 606.

Specifically, in the embodiment of FIG. 6A, the output optic 606 comprises a prism 508 and a second optical element 609. This second optical element 609 can comprise a variety of different elements, including mirrors and refractive optical elements such as prisms and lenses. Such a second optical element 609 will include a second optical element surface having a freeform rotationally asymmetric shape.

For example, the second optical element 609 can be implemented with a mirror, where the mirror will provide one additional surface with a freeform rotationally asymmetric shape. Alternatively, the second optical element 609 can be implemented with a refractive element, where the refractive element can provide one or more additional surfaces, with at least one of these additional surfaces having a freeform rotationally asymmetric shape.

In the example of FIG. 6A, the second optical element 609 provides at least one additional surface 616 to the output optic 606. This additional surface 616 is configured to work with the first surface 510, second surface 512, and third surface 514 of the prism 508. Specifically, the surfaces 510, 512 and 514 of the prism 508 and the surface 616 are each formed to have a freeform rotationally asymmetric shape, and these freeform rotationally asymmetric shapes are configured to function together to correct distortion in projected images. Thus, the embodiment of FIG. 6A provides an additional interaction with the laser beam and thus can provide additional distortion reduction compared to the previous embodiment. Furthermore, the addition of the surface 616 to the output optic 606 can reduce the amount of work that must be done by each surface, and thus can result in simpler and easier to manufacture shapes being sufficient to accomplish the distortion reduction for good image quality. Finally, in embodiments where the second optical element 609 is a refractive element, this additional refractive element can also be used to reduce chromatic aberration in the final projected image.

Finally, various coatings can be applied to the surface 616, including reflective and anti-reflective coatings as needed.

Next, while FIG. 6A illustrates the output optic 606 being implemented with the second optical element 609 and prism 508, such a second optical element 609 can instead be any of the other types of prisms described above. For example, the second optical element 609 can be implemented with the prisms 308 and 408 of FIGS. 3 and 4 respectively. And again, in any such embodiment the second optical element 609 can comprise a mirror, refractive element, lens, or any combination thereof.

Figure 6B:
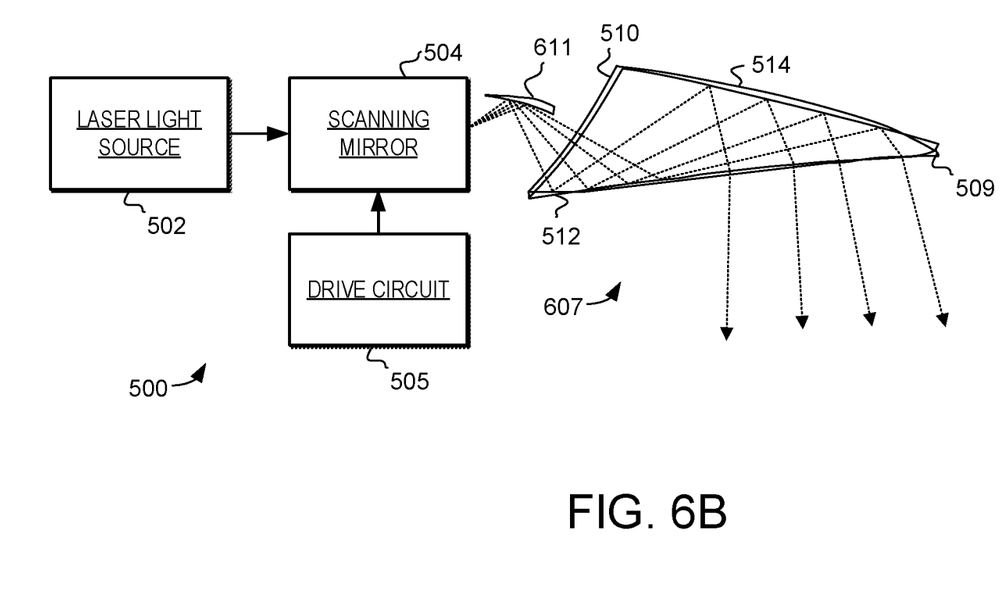

Finally, while FIG. 6A illustrates the second optical element 609 being placed in the optical path after with the prism 508, that this is just one example, and in other implementations the second optical element can be placed before the prism. Turning now to FIG. 6B, an embodiment is illustrated where the output optic 607 comprises a prism 509 and a second optical element 611. In this illustrated embodiment the second optical element 611 is placed in the optical path before the prism 509, between the scanning mirror 504 and the prism 509. Again, this second optical element 611 can comprise a variety of different elements, including mirrors and refractive optical elements such as prisms and lenses. And again, the addition of the second optical element 611 can provide one or more additional surfaces having at least one freeform rotationally asymmetric shape.

Thus, the embodiment of FIG. 6B also provides an additional interaction with the laser beam and thus can provide additional distortion reduction compared to the previous embodiment. Furthermore, this embodiment can again reduce the amount of work that must be done by each surface, and thus can result in simpler and easier to manufacture shapes being sufficient to accomplish the distortion reduction for good image quality.

Next it should be noted that while the embodiments of FIG. 3-6 show a prism that has three actives surfaces (i.e., three surfaces that are impacted by the laser beam) that in other embodiments the prism can comprise a sold active figure element that includes greater number of active surface. For example, the prism can be implemented as a cubic type element with four active surfaces.

In each of the various embodiments described above, the output optic includes a plurality of surfaces. These surfaces interact with the laser to reduce distortion in the projected image. As was described above, in the various embodiments the surfaces in the output optic are formed to have freeform rotationally asymmetric shapes. These freeform rotationally asymmetric shapes would be selected to work together to reduce distortion and provide a good image quality at both relatively long and relatively short projection distances. To facilitate this, a variety of tools and techniques can be used to define and select the precise shapes that would be implemented in a particular output optic.

In one embodiment, the freeform rotationally asymmetric shapes are each defined by an expended polynomial that defines a surface. For example, the freeform rotationally asymmetric shapes can each be defined by a corresponding polynomial that is a function of at least two independent, transverse coordinate variables. In such an embodiment each shape of the surfaces can be independently defined by their own polynomial and coordinate variables to provide maximum flexibility.

As a more specific example, in one embodiment the freeform rotationally asymmetric shapes are defined by Chebyshev polynomial surfaces. In another more specific example, the freeform rotationally asymmetric shapes are defined by a Zernike surfaces. Again, in such embodiments each shape of the surfaces can be independently defined and implemented to provide maximum flexibility. Finally, in each case these techniques allow shapes to be defined that when implemented in an output optic can be used to reduce distortion at relatively short projection distances.

A variety of techniques can then be used for determining the variables and other parameters in the polynomials used to determine the shapes in an output optic. Typically, the optimization of all active surfaces in the output optic would be done together. Thus, the shapes of first, second and third surfaces in the prism can all be determined together along with the shapes of any additional reflective or refractive surfaces.

As one example, a merit function can be provided that defines the various constraints and goals of the projected image. For example, the merit function can define target levels or smile and keystone distortions at various projection distances. Likewise, the merit function can define the target laser spot size or ratio of laser spot size to pixel image size for these various projection distances. Potential other parameters and constraints in the merit function can include chromatic aberration target, image size target and horizontal or vertical line spacing targets.

It should be noted that some of these parameters and other constraints can be weighted more or less in the merit function depending on specific needs. For example, in some embodiments it may be desirable to heavily weight a target spot size. In other embodiments it may be desirable to limit the amount of work done by a particular surface. For example, it may be desirable to increase the amount of work done by reflective surfaces compared to the work done by refractive surfaces to reduce the amount of chromatic aberration that would otherwise occur in the refractive surfaces. With these and other parameters included in the merit function, optical optimization software can be used to find a local or global minimum of the merit function and provide the ability to make appropriate tradeoffs. Thus, the parameters can be determined that precisely define the shapes of the surfaces in the output optic, including the first, second and third surface in the prism.

Figure 7:
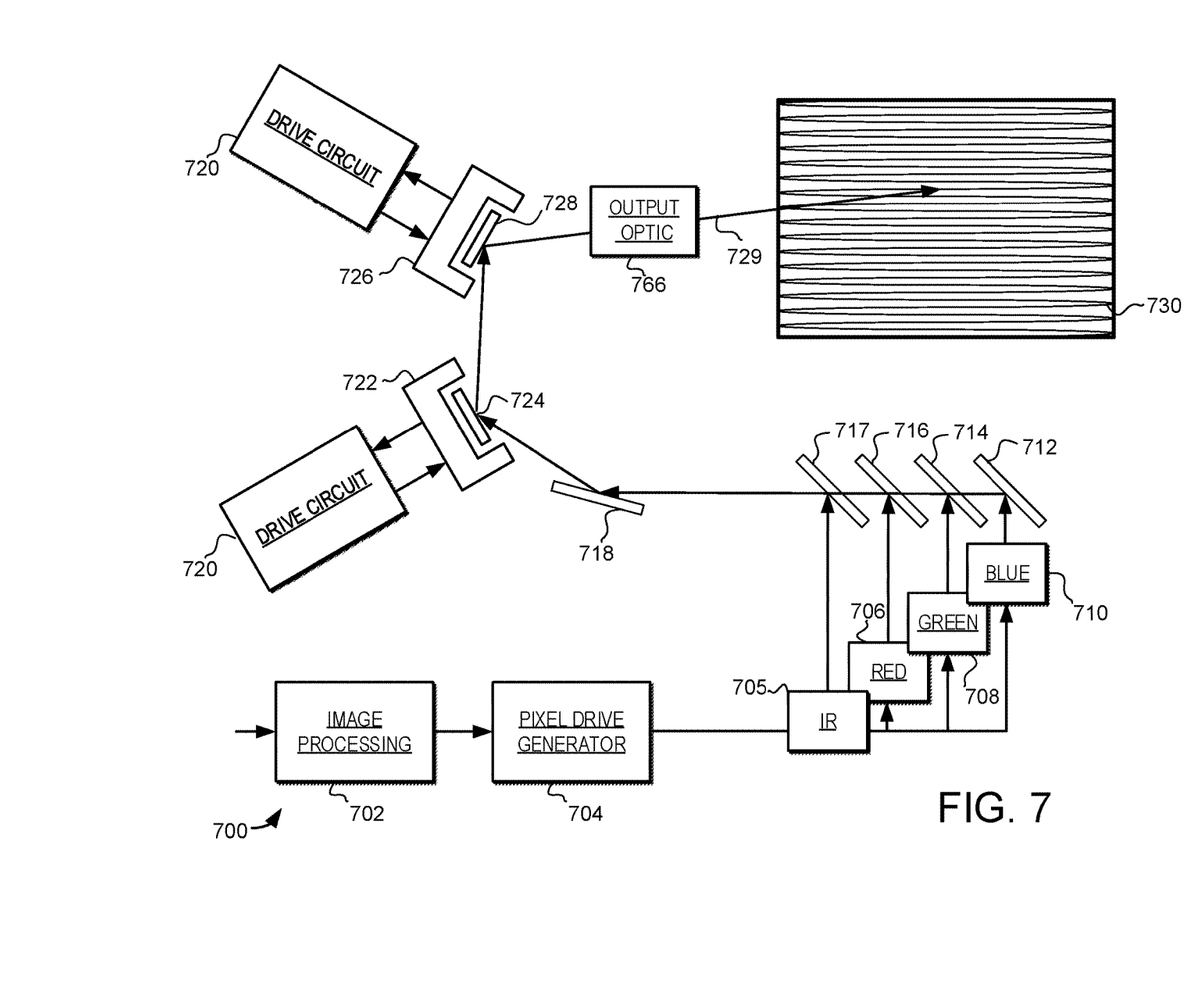
FIG. 7 shows a schematic view of a scanning laser projector in accordance with various embodiments of the present invention.

Turning now to FIG. 7, a schematic view of a scanning laser projector 700 is illustrated. The scanning laser projector 700 is a more detailed example of the type of system that can be used in accordance with various embodiments of the present invention. Specifically, the scanning laser projector 700 can be implemented using any of the output optics described above. In some embodiments, the scanning laser projector 700 is implemented to provide both laser depth scanning and laser image projection, while in other embodiments, only image projection is provided.

Scanning laser projector 700 includes an image processing component 702, a pixel drive generator 704, an infrared laser module 705, a red laser module 706, a green laser module 708, and a blue laser module 710. In such an embodiment, the red, green and blue light can be used for image projection, while the infrared light can be used for depth scanning. Light from the laser modules is combined with dichroics 712, 714, 716, and 717. Scanning laser projector 700 also includes fold mirror 718, drive circuits 720, a first scanner assembly 722 with first scanning mirror 724, and second scanner assembly 726 with a second scanning mirror 728. It should be noted that this illustrated arrangement for combing the outputs from the various laser modules is just one example implementation, and other implementations using different techniques for combing laser light of different wavelengths can instead be used.

In operation, image processing component 702 processes video content using two dimensional interpolation algorithms to determine the appropriate spatial image content for each scan position at which an output pixel is to be displayed by the pixel drive generator 704. For example, the video content may represent a grid of pixels at any resolution (e.g., 640×480, 848×480, 1280×720, and 1920×1080). The input light intensity encoding typically represents the light intensity in 8, 10, 12 bit or higher resolutions.

This content is then mapped to a commanded current for each of the red, green, and blue laser sources such that the output intensity from the lasers is consistent with the input image content. In some embodiments, this process occurs at output pixel rates in excess of 150 MHz. The laser beams are then directed onto scanning mirrors 724 and 728. In general, the first scanning mirror 724 provides for one axis of motion (e.g., horizontal), while the second scanning mirror 728 provides for another axis of motion (e.g., vertical). In a typical implementation of such an embodiment, the second scanning mirror 728 is operated to provide the vertical scanning motion at a relatively slow scan rate, while the first scanning mirror 724 is operated to provide horizontal motion at a relatively fast scan rate. This results in the output beam 729 generating a scanning pattern 730.

To provide such a system, the rotation of the second scanning mirror 728 can be operated quasi-statically to create a vertical sawtooth raster trajectory. Conversely, the rotation of the first scanning mirror 724 can be operated on a resonant vibrational mode of the scanning mirror 724 to create sinusoidal motion. Together, this generates both horizontal and vertical motion of the laser beam and results in the pattern 730 of scan lines.

In these embodiments, output beam 729 sweeps back and forth left-to-right in a sinusoidal pattern, and sweeps vertically (top-to-bottom) in a sawtooth pattern with the display blanked during flyback (bottom-to-top). It should be noted that the illustrated scanning pattern 730 shows a sinusoidal pattern as the beam sweeps vertically top-to-bottom, but does not show the flyback from bottom-to-top.

In other embodiments, the vertical sweep is controlled with a triangular wave such that there is no flyback. In still further embodiments, the vertical sweep is sinusoidal. Finally, the various embodiments of the invention are not limited by the waveforms used to control the vertical and horizontal sweep or the resulting raster pattern 730.

It should be noted that in some embodiments, the first scanner assembly 722 and the second scanner assembly 726 both use electromagnetic actuation. However, in other embodiments one more of the scanner assemblies can use other techniques, including electrostatic or piezoelectric actuation. Furthermore, any number of mirrors and type of mirror actuation may be employed without departing from the scope of the present invention.

The drive circuits 720 provide drive signals to scanner assemblies 722 and 726. The drive signals include excitation signals to control the motion of the scanning mirrors 724 and 728. In operation, the laser light sources produce light pulses for each output pixel and scanning mirrors 724 and 728 reflect the light pulses as the output beam 729 traverses the pattern 730. Drive circuits 720 can also receive feedback signals from scanner assemblies 722 and 726. The feedback signals can describe the driven deflection angles of the mirrors, and can be used by the drive circuits 720 to more accurately control the motion of the scanning mirrors 724 and 728.

For example, the drive circuits 720 can excite resonant motion of scanning mirrors 724 and/or 728 such that the peak amplitude of the feedback signal is constant. This provides for a stable maximum angular deflection on the fast-scan axis as shown in raster pattern 730. The excitation signal used to excite resonant motion of scanning mirrors 724 and 728 can include both amplitude and a phase. Drive circuits 720 can include feedback circuits that modify the excitation signal amplitude to keep the feedback signal peak amplitude substantially constant. Additionally, the drive circuits 720 can modify the excitation signal to control the horizontal phase alignment and vertical position of the raster pattern 730.

To facilitate this, drive circuits 720 may be implemented in hardware, a programmable processor, or in any combination. For example, in some embodiments, drive circuit 720 is implemented in an application specific integrated circuit (ASIC). Further, in some embodiments, some of the faster data path control is performed in an ASIC and overall control is provided by a software programmable microprocessor.

It should be noted that while FIG. 7 illustrates an embodiment with red, green, blue, and infrared laser light sources, the various embodiments are not limited to these exemplary wavelengths of laser light.

Finally, in accordance with the embodiments described herein, output optic 766 is implemented in the optical path after the second scanning mirror 728. Thus, the laser beams pass through the output optic 766 and are outputted to the display surface to generate a projected image. It should be noted that in some embodiments additional optical elements can be provided between the output optic 766 and the projected image.

In general, the output optic 766 includes a plurality of freeform rotationally asymmetric shapes configured to reduce the distortions that could otherwise occur at relatively short projection distances, while also providing good image quality at relatively long projection distances. For example, the output optic 766 can be configured to reduce both keystone and smile distortions at relatively short projection distances. Additionally, the output optic 766 can be configured to reduce these distortions while maintaining a desired ratio of laser spot size to ideal pixel size. Finally, it is desirable that the output optic 766 provide these results while limiting introduced chromatic aberrations. Providing good image quality over a relatively wide range of projection distances facilitates the use of the scanning laser projector 100 in different configurations and in different applications.

Finally, the output optic 766 can be configured to perform other compensations in the scanning laser projector 700. Specifically, the output optic 106 can be configured to compensate for a non-orthogonal projection angle with respect to the display surface. Finally, the output optic 106 can be configured to compensate for a non-normal MEMS feed angle and to provide an increased field of view.

In one embodiment, a scanning laser projector is provided, the scanning laser projector comprising: at least one source of laser light, the at least one source of laser light configured to generate a laser beam; at least one scanning mirror configured to reflect the laser beam in a pattern of scan lines; and an output optic configured to receive the reflected laser beam and output the reflected laser beam to project an image on a display surface, wherein the output optic includes a prism having a first surface, a second surface, and a third surface, wherein the first surface, the second surface, and the third surface have freeform rotationally asymmetric shapes, and wherein the freeform rotationally asymmetric shapes of first surface, the second surface, and third surface are configured to together correct for distortion in the projected image.

In another embodiment, a scanning laser projector is provided, the scanning laser projector comprising: at least one source of laser light, the at least one source of laser light configured to generate a laser beam; at least one scanning mirror configured to reflect the laser beam in a pattern of scan lines; and an output optic configured to receive the reflected laser beam and output the reflected laser beam to project an image on a display surface, wherein the output optic includes a prism having a first surface, a second surface, and a third surface, wherein the prism is configured such that the laser beam enters the prism through the first surface and reflects internally at the second surface, wherein the first surface, the second surface, and the third surface have freeform rotationally asymmetric shapes, and wherein the freeform rotationally asymmetric shapes of first surface, the second surface, and third surface are configured to together correct for distortion in the projected image.

In another embodiment, a scanning laser projector is provided, the scanning laser projector comprising: at least one source of laser light, the at least one source of laser light configured to generate a laser beam; at least one scanning mirror configured to reflect the laser beam; a drive circuit configured to provide an excitation signal to excite motion of the at least one scanning mirror to reflect the laser beam in a pattern of scan lines; a pixel drive generator, the pixel drive generator configured to control the at least one source of laser light to generate projected image pixels with the laser beam; and an output optic configured to receive the reflected laser beam and direct the reflected laser beam to project an image on a display surface, wherein the output optic includes a prism having a first surface, a second surface, and a third surface, wherein the prism is configured such that the laser beam enters the prism through the first surface and reflects internally at the second surface, wherein the first surface, the second surface, and the third surface have freeform rotationally asymmetric shapes, and wherein the freeform rotationally asymmetric shapes of first surface, the second surface, and third surface are configured to together reduce keystone and smile distortion while maintaining a ratio of spot size to ideal pixel size when the display surface is at at least one distance between 100 mm and 400 mm from the output optic.

In the preceding detailed description, reference was made to the accompanying drawings that show, by way of illustration, specific embodiments in which the invention may be practiced. These embodiments were described in sufficient detail to enable those skilled in the art to practice the invention. It is to be understood that the various embodiments of the invention, although different, are not necessarily mutually exclusive. For example, a particular feature, structure, or characteristic described herein in connection with one embodiment may be implemented within other embodiments without departing from the scope of the invention. In addition, it is to be understood that the location or arrangement of individual elements within each disclosed embodiment may be modified without departing from the scope of the invention. The preceding detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

Although the present invention has been described in conjunction with certain embodiments, it is to be understood that modifications and variations may be resorted to without departing from the scope of the invention as those skilled in the art readily understand. Such modifications and variations are considered to be within the scope of the invention and the appended claims.

What is claimed is:

1. A scanning laser projector, comprising:
    at least one source of laser light, the at least one source of laser light configured to generate a laser beam;
    at least one scanning mirror configured to reflect the laser beam in a pattern of scan lines; and
    an output optic configured to receive the reflected laser beam and output the reflected laser beam to project an image on a display surface, wherein the output optic includes:
        a prism having a first surface, a second surface, and a third surface, wherein the first surface, the second surface, and the third surface have freeform rotationally asymmetric shapes;
        a mirror, the mirror including a mirror surface having a freeform rotationally asymmetric shape; and
        wherein the freeform rotationally asymmetric shapes of the first surface, the second surface, the third surface, and the mirror surface are configured to together correct for distortion in the projected image, wherein the freeform rotationally asymmetric shapes are configured to increase a field of view of the projected image while maintaining a ratio of spot size to ideal pixel size, and wherein the mirror surface is further configured to reduce chromatic aberration in the projected image.

2. The scanning laser projector of claim 1, wherein the prism is configured such that the laser beam enters the prism through the first surface and reflects internally at the second surface.

3. The scanning laser projector of claim 2, wherein the prism is configured such that the laser beam reflects internally at the second surface using total internal reflection (TIR).

4. The scanning laser projector of claim 2, wherein the prism includes a reflective coating at the second surface to facilitate the laser beam reflecting internally at the second surface.

5. The scanning laser projector of claim 4, wherein the reflective comprises at least one of a metallic coating and a dielectric coating.

6. The scanning laser projector of claim 4, wherein the prism further includes a second reflective coating at the third surface.

7. The scanning laser projector of claim 1, wherein the prism is configured such that the laser beam enters the prism through the first surface, reflects internally at the second surface, and exits the prism through the third surface.

8. The scanning laser projector of claim 1, wherein the prism is configured such that the laser beam enters the prism through the first surface, reflects internally at the second surface, reflects internally at the third surface, and exits the prism through the second surface.

9. The scanning laser projector of claim 1, wherein the prism is configured such that the laser beam enters the prism through the first surface, reflects internally at the second surface, reflects internally at the third surface, and exits the prism through the first surface.

10. The scanning laser projector of claim 1, wherein the distortion in the projected image comprises keystone and smile distortion and wherein the freeform rotationally asymmetric shapes are configured to reduce the keystone and smile distortion.

11. The scanning laser projector of claim 10, wherein the mirror is positioned between the at least one scanning mirror and the prism.

12. The scanning laser projector of claim 10, wherein the mirror is positioned between the prism and an output of the scanning laser projector.

13. The scanning laser projector of claim 1, wherein the freeform rotationally asymmetric shapes are defined by at least on of an extended polynomial surface, a Chebyshev polynomial surface, and a Zernike surface.

14. The scanning laser projector of claim 1, wherein the freeform rotationally asymmetric shapes are each defined by a corresponding polynomial that is a function of two independent, transverse coordinate variables.

15. The scanning laser projector of claim 1, wherein the freeform rotationally asymmetric shapes are configured to reduce keystone and smile distortion while maintaining a ratio of spot size to ideal pixel size when the display surface is at at least one distance between 100 mm and 400 mm from the output optic.

16. A scanning laser projector, comprising:
    at least one source of laser light, the at least one source of laser light configured to generate a laser beam;
    at least one scanning mirror configured to reflect the laser beam in a pattern of scan lines; and
    an output optic configured to receive the reflected laser beam and output the reflected laser beam to project an image on a display surface, wherein the output optic includes:
        a prism having a first surface, a second surface, and a third surface, wherein the prism is configured such that the laser beam enters the prism through the first surface and reflects internally at the second surface, wherein the first surface, the second surface, and the third surface have freeform rotationally asymmetric shapes;
        a mirror, the mirror including a mirror surface having a freeform rotationally asymmetric shape; and
        wherein the freeform rotationally asymmetric shapes of the first surface, the second surface, the third surface, and the mirror surface are configured to together correct for distortion in the projected image, wherein the freeform rotationally asymmetric shapes are configured to increase a field of view of the projected image while maintaining a ratio of spot size to ideal pixel size, and wherein the mirror surface is further configured to reduce chromatic aberration in the projected image.

17. The scanning laser projector of claim 16, wherein the prism is configured such that the laser beam further exits the prism through the third surface.

18. The scanning laser projector of claim 16, wherein the prism is configured such that the laser beam further reflects internally at the third surface, and exits the prism through the second surface.

19. The scanning laser projector of claim 16, wherein the prism is configured such that the laser beam further reflects internally at the third surface, and exits the prism through the first surface.

20. The scanning laser projector of claim 16, wherein the distortion in the projected image comprises keystone and smile distortion and wherein the freeform rotationally asymmetric shapes are configured to reduce the keystone and smile distortion.

21. A scanning laser projector, comprising:
- at least one source of laser light, the at least one source of laser light configured to generate a laser beam;
- at least one scanning mirror configured to reflect the laser beam;
- a drive circuit configured to provide an excitation signal to excite motion of the at least one scanning mirror to reflect the laser beam in a pattern of scan lines;
- a pixel drive generator, the pixel drive generator configured to control the at least one source of laser light to generate projected image pixels with the laser beam; and
- an output optic configured to receive the reflected laser beam and direct the reflected laser beam to project an image on a display surface, wherein the output optic includes:
  - a prism having a first surface, a second surface, and a third surface, wherein the prism is configured such that the laser beam enters the prism through the first surface and reflects internally at the second surface, wherein the first surface, the second surface, and the third surface have freeform rotationally asymmetric shapes;
  - a mirror, the mirror including a mirror surface having a freeform rotationally asymmetric shape; and
  - wherein the freeform rotationally asymmetric shapes of the first surface, the second surface, the third surface, and the mirror surface are configured to together increase a field of view of the projected image while maintaining a ratio of spot size to ideal pixel size and to further reduce keystone and smile distortion while maintaining a ratio of spot size to ideal pixel size when the display surface is at at least one distance between 100 mm and 400 mm from the output optic, and wherein the mirror surface is further configured to reduce chromatic aberration in the projected image.

* * * * *